July 18, 1939.  M. CÔTÉ  2,166,798
METHOD OF APPLYING GUARDS OR BUMPERS
Filed July 17, 1937
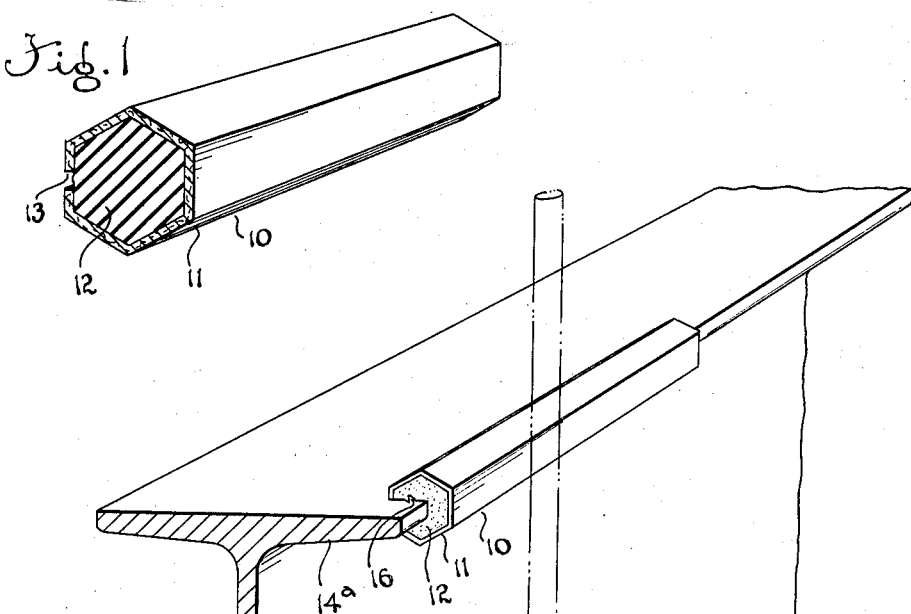
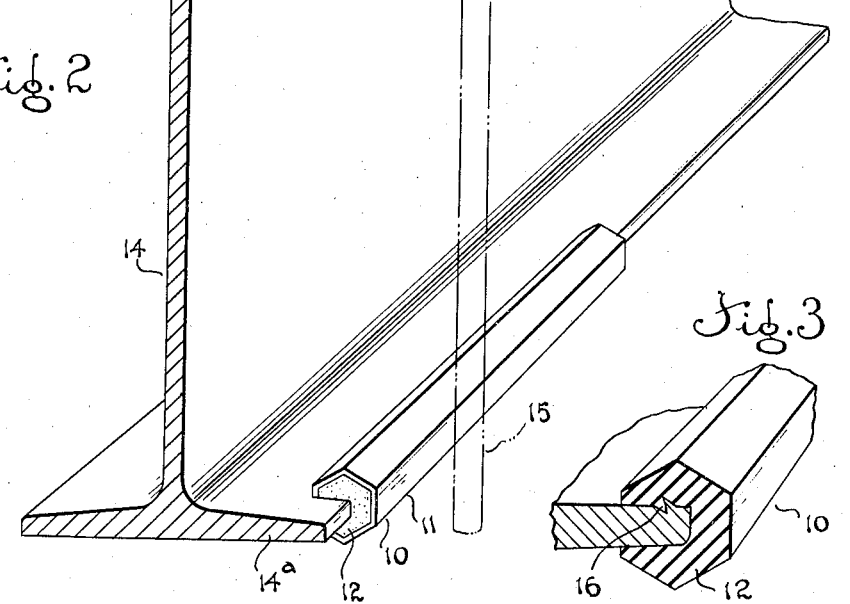
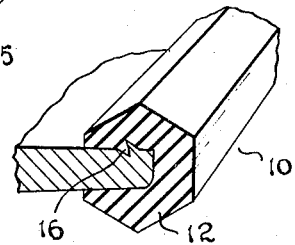
Inventor
Marcellin Côté
By J. Ralph Barrow
Attorney Patented July 18, 1939

2,166,798

UNITED STATES PATENT OFFICE 2,166,798

METHOD OF APPLYING GUARDS OR BUMPERS

Marcellin Côté, Akron, Ohio

Application July 17, 1937, Serial No. 154,256

1 Claim. (Cl. 18—59)

This invention relates to guards or bumpers and methods or procedure for applying the same.

Heretofore, preformed resilient or elastic guards or bumpers have been applied on structural elements in situ, by various attaching means or fasteners and by adhesives. In the manufacture of various articles, rubber has been vulcanized to metals, woods, and other materials during the manufacturing process. But frequently it is desirable to place bumpers of resilient materials at certain definite points on an element of a structure which points of location cannot be predetermined in the production of said element. This, in the past, has prevented the use of integral rubber or like bumpers with the many advantages of such integral construction. Such guards or bumpers, for example, are effectively used on beams, girders, and other structural parts for a building at points where cables, electrical leads, etc. may chafe as in the elevator shafts of large buildings.

The principal object of the present invention is to provide a simple, inexpensive, integral guard or bumper and method of applying the same on structural elements and curing the same thereon in situ, as for example, on beams and girders in building structures, whereby wear on cables, conduits, etc., caused by chafing against such structural elements is obviated. Such a guard will act as an electrical insulator so that if a base wire should rub against the structural element the danger of short-circuiting and the fire hazard attendant thereto is obviated.

Another object of the invention is to provide a method of molding resilient or elastic bumpers on structural elements of all kinds of material, including metal, wood, glass, stone, concrete, etc., in such a manner that they will cling tenaciously thereto even under considerable shock.

Other objects of the invention will be manifest from the following brief description and the accompanying drawing.

Of the accompanying drawing:

Figure 1 is a perspective view, partly in cross-section, of a bumper or guard molded to shape, but prior to being applied in position on a structural element.

Figure 2 is a perspective view of a structural element having improved guards or bumpers applied thereto.

Figure 3 is a fragmentary perspective view of a guard applied to a structural element, the molding casing of the guard having been removed.

Referring to the drawing, the guard or bumper 10 may be made by first forming a mold or container 11 of suitable material, such as metal, cardboard, fibre, wood, fabric, rubber, paraffin, etc., and then packing the cavity thereof with a filler 12 of self-curing or self-setting plastic rubber compound. A suitable slot or opening 13 may be provided in the mold 11 for a purpose subsequently to be described. A plastic rubber compound which has been found to be suitable for the purposes of this invention is one called "Hornex", manufactured by H. E. Horn Company, Long Island City, New York. This compound is at present supplied in the form of several separate ingredients readily mixable to make a soft, pliable material which, when allowed to stand for a certain period of time, sets or cures itself, thereafter having the characteristics of vulcanized or cured rubber, such as elasticity or resiliency, but with a further characteristic that it will adhere tenaciously to almost any kind of material, as for example, metal, wood, glass, stone, concrete, and many other materials commonly used in building construction.

After the guard 10 has been formed in the desired shape or cross-section, and while the compound 12 is still in a pliable condition, it may be applied to a portion of a structural element, such as the marginal edges 14$^a$, 14$^a$ of an I-beam 14 (see Figure 2) by engaging the slot or opening in the mold with the edge of the I-beam and pressing the mold onto the flange of the beam. This causes the material to be molded under pressure on the I-beam. A cable or conduit, desired to be protected against chafing by contact with the I-beam 14, is indicated in broken lines at 15.

When the plastic compound 12 has been allowed to set or cure for a certain period of time, it becomes firmly adhered to the I-beam 14, after which the mold 11 may either be allowed to remain on the guard 10 as a part thereof or it may be removed or stripped away to leave a guard comprising plastic material 12 only, as shown in Figure 3. Where such materials as cardboard, fabric, fibre or paraffin are used for mold 11, they may be removed as by breaking or tearing, but when materials such as wood, or metal are used the inside surface of casing 11 may be coated with a suitable lubricant such as paraffin or wax to facilitate removal thereof by sliding it intact over the hardened surface of the plastic material 12. To assist the bond of the guard 10 to the structural element 14, anchorage may be provided thereon, as shown at 16, by pricking either at intervals or to the full length of guard 10 with a diamond point or chisel. The molds 11 may be preformed in comparatively long lengths to be subsequently cut in shorter lengths as required.

Although only one form of the invention has been shown and described, modifications may be made thereto without departing from the spirit of the invention or the scope of the appended claim.

What is claimed is:

That method of molding elastic or resilient guards or bumpers on structural elements in situ, which comprises providing a continuous mold, said mold having a slit therein adapted to receive a portion of said structural element to which said guard is to be molded, filling said mold with self-curing or self-setting plastic rubber compound, and applying said filled mold to said structural element while said compound is in a pliable condition by engaging said portion of said element through said slit to become embedded in said compound, said engaging portion of said element thereby preventing escape of said compound through the slit to permit compaction of the compound within said mold as the compound is assembled on said structural element.

MARCELLIN CÔTÉ.